United States Patent [19]
Rivoir

[11] Patent Number: 6,105,087
[45] Date of Patent: Aug. 15, 2000

[54] EVENT RECOGNITION BY A STATE MACHINE WHOSE STATE IS DEPENDENT UPON HISTORICAL INFORMATION

[75] Inventor: Jochen Rivoir, Magstadt, Germany

[73] Assignee: Hewlett-Packard Company, Palo Alto, Calif.

[21] Appl. No.: 09/095,467

[22] Filed: Jun. 10, 1998

[51] Int. Cl.[7] .................................................. G06F 11/22
[52] U.S. Cl. ............................. 710/100; 710/19; 714/39; 714/45; 714/51; 714/819; 714/822
[58] Field of Search ....................... 710/100, 19; 714/39, 714/45, 51, 819, 822

[56] References Cited

U.S. PATENT DOCUMENTS

| | | | |
|---|---|---|---|
| 4,802,103 | 1/1989 | Faggin et al. | 364/513 |
| 5,457,694 | 10/1995 | Smith | 714/712 |
| 5,521,967 | 5/1996 | Novas et al. | 379/100 |
| 5,596,749 | 1/1997 | Cantrell et al. | 709/103 |
| 5,642,479 | 6/1997 | Flynn | 714/45 |
| 5,983,164 | 11/1999 | Ocondi | 702/12 |

*Primary Examiner*—Ayaz R. Sheikh
*Assistant Examiner*—Eric S. Thlang

[57] ABSTRACT

A data-analyzing unit monitors and/or analyzes events on an information bus. The data-analyzing unit comprises an event recognition unit with one or more comparators coupled to the information bus and a sequencer state machine for determining sequential dependencies of events, whereby a state of the sequencer state machine depends on the history of information as provided thereto. The data-analyzing unit preferably comprises one or more counters coupled to the event recognition unit, thus allowing an analysis of data and/or events on the information bus. The data-analyzing unit may also comprise one or more memories coupled to the event recognition unit, thus providing a trace memory. In a preferred embodiment, the event recognition unit of the data-analyzing unit provides customized rules for monitoring defined event sequences of event behaviors thus allowing the monitoring of defined event sequences of event behaviors and possibly the drawing of conclusions therefrom e.g. by signaling an unwanted event behavior. The data-analyzing unit according to the invention is preferably used in a logic analyzer.

13 Claims, 4 Drawing Sheets

EVENT RECOGNITION BY A STATE MACHINE WHOSE STATE IS DEPENDENT UPON HISTORICAL INFORMATION

FIELD OF THE INVENTION

The present invention generally relates to a data-analyzing unit for monitoring and/or analyzing events on an information bus.

BACKGROUND OF THE INVENTION

There are several possibilities known in the art to recognize events in a data processing unit such as a personal computer (PC), a workstation, or the like. The term 'event', as used herein, shall refer to any kind of occurrence of significance, e.g. a deadlock situation ('transfer does not complete'), a dead system ('no bus traffic after x clocks'), an access to an address A by an agent B, or the like.

Events occurring in the data processing unit are normally recognized by monitoring data communication facilities such as data busses, whereby the term 'data bus' shall refer to any kind of data connection as known in the art.

FIG. 1 depicts an event counter 5 for real time counting as a device for event recognition, as known in the art. A comparator 10 receives at least one input signal to be observed on an input bus 20. The comparator 10 monitors input bus 20 for a predefined pattern and provides a count signal on a line 30 to a counter 40, e.g., a logical '1' in case of an observed event (i.e. the predefined pattern has been detected). A pattern on input bus 20 is detected when, for each of the signals that is present on input bus 20, one of the following conditions is met: the input signal is in the logical '0' state, or in the logical '1' state, or is in any logical state (don't care), dependent on its specification. The number of events in the input signal on the input bus 20 is thus count by the counter 40.

The term 'counters' as used herein shall apply to devices, such as registers or storage locations, which are used to represent a number of occurrences of an event. Counters are normally used in conjunction with a filter or trigger module for realtime counting of a specific event.

Comparator 10, or another filter or trigger module, determines, according to the predefined pattern, whether or not the occurred event will be counted by the counter 40. A more illustrative example to understand the function of conventional event counter 5 would be a task to measure all red cars traveling from a point A to a point B. Comparator 10 (as filter or trigger task) would select the red cars only and send this information via line 30 to the counter 40, which would count the number of red cars as the filtered or triggered events.

Event counters 5 are often applied for performance measurement purposes. The performance represents the degree to which a system or component accomplishes its designated function within given constraints, such as speed, accuracy or memory usage. The performance can be defined, e.g., by the ratio of the number of specific events to all events, or by the number of events per time unit.

For performance measurements (e.g. 'the percentage of red cars'), input bus 20 might further be coupled to an input information counter 50 which counts all events in the input signal on input bus 20, whereas event counter 5 only counts specific events defined by the specific pattern. The counter 40 of event counter 5 and input information counter 50 are coupled to a processing unit 60 which determines the performance on input bus 20, e.g., by dividing the content of counter 40 by the content of the input information counter 50. The input information counter 50 can basically be built in accordance with event counter 5.

Information received from a performance measurement according to FIG. 1 provides only limited information about the actual performance on input bus 20 and might not be sufficient for certain applications.

Another known device for event evaluation is a so-called trace memory 70. Trace memory 70 comprises an event recognizer 80 coupled via a line 85 to a memory 90, for controlling a read/write access of the memory 90 on the input bus 20. Memory 90 stores events recognized by event recognizer 80. Trace memory 70 thus allows selected events to be traced, e.g. for logic analysis. Event recognizer 80 normally allows—dependent on a recognized event—to either move to a successive state, to jump to a predefined state, or to stay in the current state. This, however, may not be sufficient for applications that are more complex.

It is object of the present invention to provide an improved tool for monitoring and/or processing events occurring in a data processing unit.

SUMMARY OF THE INVENTION

For the purpose of initiating bus transactions (i.e. a write access to a system memory via a PCI bus), the system HP E2910A, introduced by the assignee of applicant, has heretofore used a plurality of comparators in combination with a sequencer state machine as an event recognition unit 100, as depicted in FIG. 2. Event recognition unit 100 comprises one or more comparators 110$a$ . . . 110$z$, which are coupled to an information bus 120. An output of each of comparators 111$a$ . . . 110$z$ is coupled via a line 130$a$ . . . 130$z$ to a sequencer state machine 140. Sequencer state machine 140 comprises a memory 142 and a register 144, whereby one or more outputs of register 144 are coupled back to one or more inputs of memory 142, as indicated by line 146. The coupling allows sequencer state machine 140 to move between different states, whereby the specific state of sequencer state machine 140 is not constant but depends on the history of information provided thereto. Sequencer state machine 140 further receives a clock signal CLOCK on line 150, and eventually provides an output on bus 160 for initiating the bus transactions.

In the HP E2910A, the comparators 110$a$ . . . 110$z$ monitor information bus 120 for predefined event-patterns (in accordance with comparator 10 in FIG. 1), and thus signal occurring events to sequencer state machine 140. Sequencer state machine 140 moves from one state to a next state according to the information as provided on its inputs 130$a$ . . . 130$z$, 146, and 150. When sequencer state machine 140 reaches a certain predefined state, it initiates a corresponding bus transaction by means of respective output signals applied to output bus 160.

The invention uses event recognition unit 100 to analyze data streams on information busses 120$a$ . . . 120$z$, e.g. for applied protocols or information data, thus allowing the monitoring and analyzing of time information and correlations between events.

According to the invention, a data-analyzing unit for monitoring and/or analyzing events on an information bus comprises an event recognition unit with one or more comparators coupled to the information bus and a sequencer state machine for determining sequential dependencies of events, whereby a state of the sequencer state machine depends on the history of information provided thereto.

The data-analyzing unit according to the invention provides a powerful tool for detecting simple and complex events for all kinds of needs for event recognition, and thus a superset of the capabilities of all possible event recognizers as known in the art.

The data-analyzing unit according to the invention preferably comprises one or more counters coupled to the event recognition unit, thus allowing analysis of data and/or events on the information bus. The complexity of recognizable events is thus only limited by the number of states and the number of comparators and not by the number of state transitions or the type of possible state transitions.

The data-analyzing unit might also comprise one or more memories coupled to the event recognition unit, thus providing a trace memory.

In a preferred embodiment, the event recognition unit of the data-analyzing unit provides customized rules for monitoring defined event sequences of event behaviors, thus allowing the monitoring of defined event sequences of event behaviors and the drawing of conclusions therefrom, e.g. by a signaling of the occurrence of an unwanted event behavior.

For more complex data-analysis, the data-analyzing unit might comprise counters and/or memories coupled to the event recognition unit and might additionally provide customized rules.

The data-analyzing unit according to the invention is preferably used in a logic analyzer.

BRIEF DESCRIPTION OF THE DRAWINGS

Other objects and many advantages of the present invention will be readily appreciated and become better understood by reference to the following detailed description when considering in connection with the accompanied drawing in which.

DETAILED DESCRIPTION OF THE INVENTION

Figure 3:
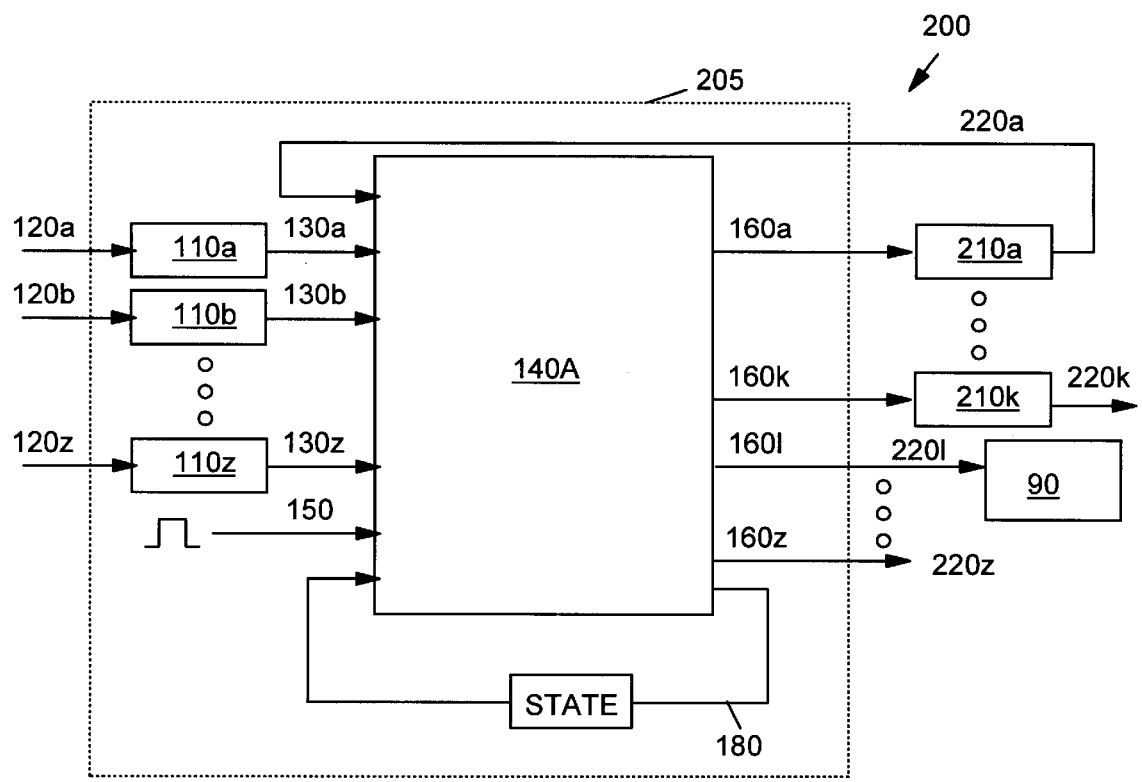
FIG. 3 shows a data-analyzing unit 200, according to the invention.

FIG. 3 shows a data-analyzing unit 200 according to the invention comprising an event recognition unit 205 as an enhanced event recognition unit 100. One or more comparators 110a . . . 110z are coupled to one or more information busses 120a . . . 120z, respectively. The information busses 120a . . . 120z can represent one single information line, a plurality of individual information busses, or combinations thereof, and may also be coupled to one information bus 120. A sequencer state machine 140A according to the invention, which basically corresponds to sequencer state machine 140, may further receive a clock signal CLOCK on line 150, and provides one or more outputs on busses 160a . . . 160z.

Sequencer state machine 140A can be embodied by any state machine known in the art and will move from one state to a next state according to the information provided on its inputs, e.g., on lines 130a . . . 130z, on line 150, and/or output 220a. The move between different states is indicated by a state loop 180, which enables the specific state of sequencer state machine 140A to be changeable and to depend on the history of information provided thereto.

In a preferred embodiment, sequencer state machine 140A comprises memory 142 and register 144 (cf. FIG. 1), whereby state loop 180 is embodied by one or more outputs of register 144 as coupled back to one or more inputs of memory 142. Register 144 may be coupled to one or more outputs of memory 142 and is preferably controlled by the clock signal CLOCK Memory 142 is preferably implemented as a random-access memory (RAM) that can be loaded by software tools. This allows the reprogramming of event recognition unit 205 at runtime by the end-user, meaning that event needs or rules need not be determined at design time, but can be defined at runtime by software tools.

For analyzing data on information busses 120a . . . 120z, sequencer state machine 140A can be coupled via one or more of output busses 160a . . . 160k to one or more counters 210a . . . 210k that provide one or more outputs 220a . . . 220k, respectively. Other output busses 160l . . . 160z may be coupled to other functional devices or provide outputs 220l . . . 220z of data-analyzing unit 200. As an example, output bus 160l (that equals output 220l) is coupled to memory 90, thus establishing a trace memory. Each one of outputs 220a . . . 220z might be coupled back to one or more inputs of sequencer state machine 140A, as depicted for output 220a, as an example.

Figure 1:
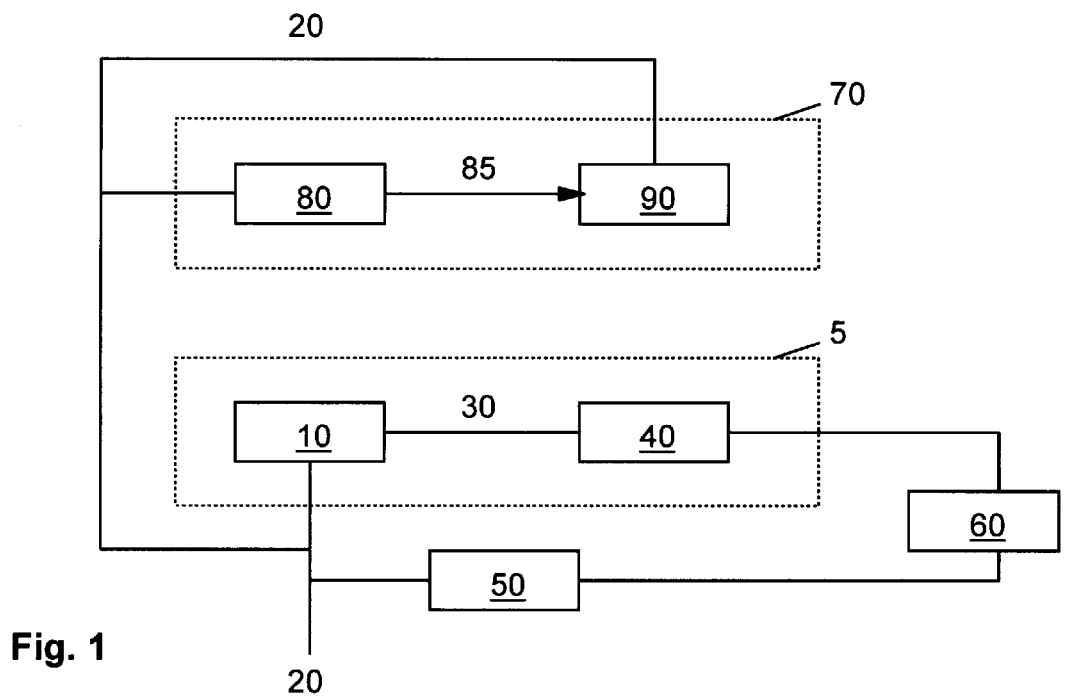
FIG. 1 depicts an event counter 5 for real time counting as a device for event recognition, as known in the art.
Figure 2:
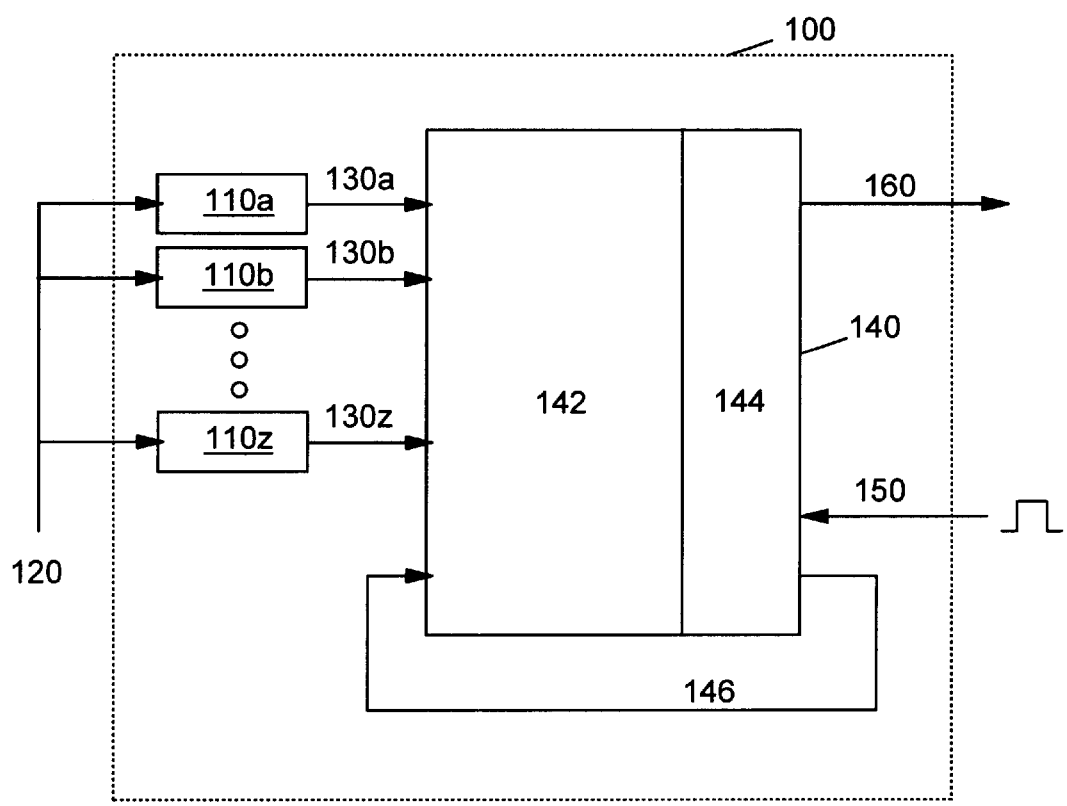
FIG. 2 shows a plurality of comparators in combination with a sequencer state machine as an event recognition unit for the purpose of initiating bus transactions.

Data-analyzing unit 200 allows measurement of a plurality of individual events, as explained for FIG. 1. Further, data-analyzing unit 200 also allows an analysis of sequential dependencies of information on information busses 120a . . . 120z, such as timing information or correlations between events. In terms of the more illustrative example as given above, one function of data-analyzing unit 200 can be to determine "the number of cars following a red car" or to determine 'the number of cars with two or more children as passengers following the same red car'.

Comparators 110a . . . 110z can be embodied by any kind of comparator means as known in the art. Preferably, programmable comparators are used which act as trigger or filter modules. Each comparator 110i of the comparators 110a . . . 110z individually compares the information as received by a respective information bus 120i of the information busses 120a . . . 120z, with a predefined information pattern and provides a signal on a respective line 130i, when the provided information matches the predefined information pattern. Depending on the information provided to the inputs of sequencer state machine 140A, e.g. the results of comparators 110a . . . 110z, the clock signal CLOCK, the state loop 180, or coupled back output lines 210i, sequencer state machine 140A will either move to a different state or stay in the same state. Sequencer state machine 140A can thus trigger one or more of counters 210a . . . 210k, to trigger memory 90 to store specific information, or provide a specific output signal. Sequential dependencies of the information provided by information busses 120a . . . 120z can thus be determined and/or traced.

Event recognition unit 205 further allows the implementing of customized rules for monitoring defined event sequences of event behaviors and drawing conclusions therefrom, e.g. by signaling an unwanted event behavior. An example of a customized rule could be to 'indicate when there are more than x clock signals CLOCKS between data transfers'.

Figure 4A:
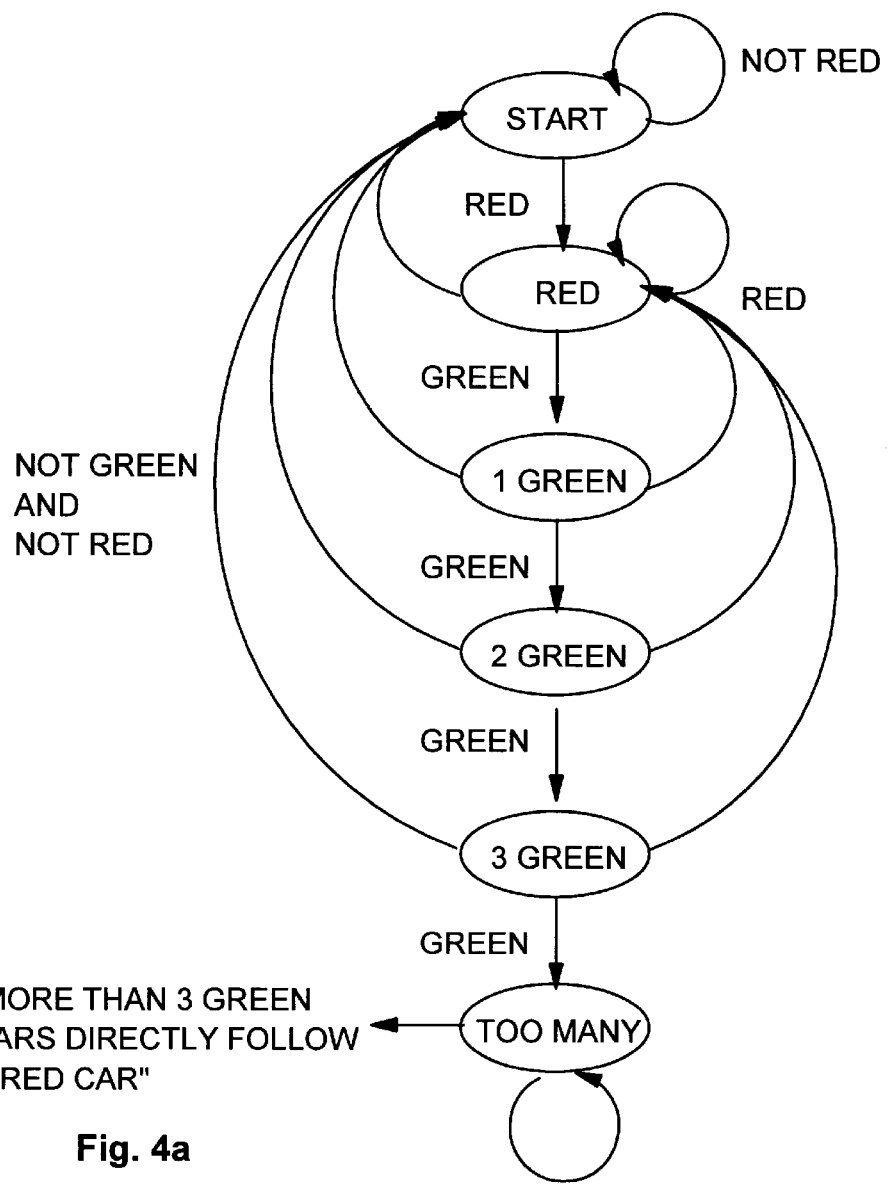
FIGS. 4a and 4b show a state diagram for an example of a customized rule and an implementation thereof.

FIG. 4a shows a state diagram for a customized rule, following the above examples, to 'initiate a signal when more than 3 green cars directly follow a red car'. Sequencer state machine 140A stays in a first state START as long as no red car is identified or will move to a second state RED when a red car is identified. Sequencer state machine 140A will move to a third state 1 GREEN when a first green car is recognized, or stay in the second state RED when another red car is identified. Sequencer state machine 140A will move from the third state 1 GREEN to a fourth state 2 GREEN when a second green car is recognized, or move to the second state RED when a red car is identified. Accordingly, sequencer state machine 140A will move from the fourth state 2 GREEN to a fifth state 3 GREEN when a third green car is recognized, or move to the second state RED when a red car is identified. Alternatively, sequencer state machine 140A will move either from the second state RED, the third state 1 GREEN, the fourth state 2 GREEN, or the fifth state 3 GREEN to the first state START when a car is recognized that is neither green nor red. Eventually, the sequencer state machine 140A will move from the fifth state 3 GREEN to a sixth state TOO MANY when a fourth green car is recognized. In the sixth state TOO MANY, sequencer state machine 140A signals that there are "MORE THAN 3 GREEN CARS DIRECTLY FOLLOWING A RED CAR" and stays in that state until it is removed to another state (not shown).

Figure 4B:
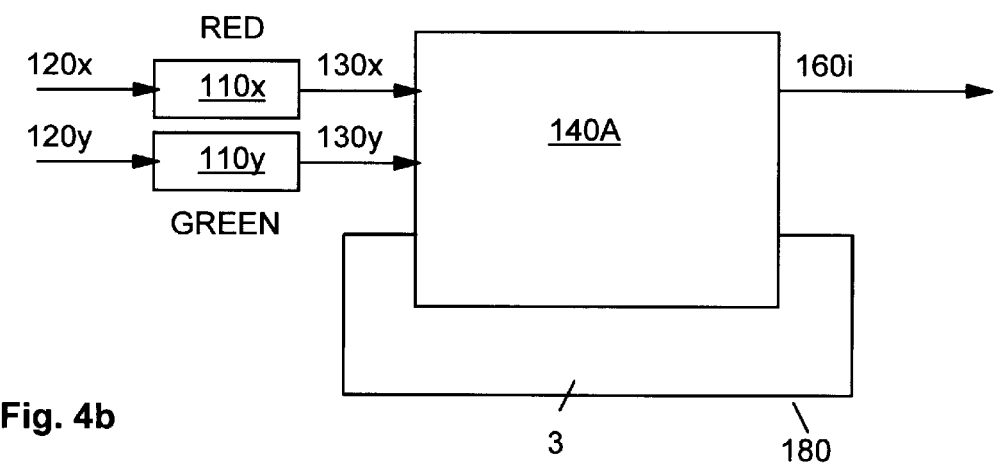

FIG. 4b shows an implementation of the customized rule depicted in FIG. 4a. Two comparators 110x and 110y monitor two information busses 120x and 120y, which are coupled to one information bus 120. Comparator 110x will output a signal on line 130x when 'a red car is recognized' on information bus 120. Comparator 110y will output a signal on line 130y when 'a green car is recognized' on information bus 120. Sequencer state machine 140A receives the signals from lines 130x and 130y.

As is apparent from FIG. 4a, there are 6 different states so that there have to be 3 feedback lines (3 bits) in state loop 180 to code the states. When the sixth state TOO MANY is reached, sequencer state machine 140A initiates the signal "MORE THAN 3 GREEN CARS DIRECTLY FOLLOW A RED CAR" on output line 160i.

It is clear that any customized rule can be implemented as shown in FIGS. 4a and 4b, whereby comparators 110i recognize the respective events while sequencer state machine 140A traces the sequential relationship between the events.

In a preferred embodiment, data-analyzing unit 200 is used in a synchronous mode. Sequencer state machine 140A receives as inputs the clock signal CLOCK on line 150 and signals from comparators 110a . . . 110z, and may further receive one or more feedback signals from one or more of outputs 220a . . . 220z. State loop 180 is implemented as a state loop bus feeding back one or more outputs to one or more state inputs of sequencer state machine 140A. On each clock cycle of the clock signal CLOCK, sequencer state machine 140A checks its inputs for information thereon and performs a specific task, dependent on the provided information. Such a task can be, e.g., a counter impulse on one or several of output busses 160a . . . 160k, or a change in state of sequencer state machine 140A.

As an example, assume the state of sequencer state machine 140A is at a binary value '000b'. The logic of sequencer state machine 140A is set to "increment counter 210a, if a pattern xyz on comparator 130a matches, and afterwards perform a jump to a state 2". The resulting actions are as follows:

(1) Check whether the comparator 130a matches pattern xyz.

(2) If yes, then "increment" counter 160a and switch sequencer state machine 140A to a state 010b.

Sequencer state machine 140 preferably performs the specific tasks by means of a memory-based look-up table (matrix or array). The size of the memory (matrix) is then determined by the number of inputs i (i.e. input lines 130a . . . 130z from the comparators 110a . . 110z, possible feed-back signals 220i, and state bus 180) and the number of outputs o (i.e., busses 160a . . . 160z and possible state outputs 200a . . . 200z for state bus 180). The matrix would be an $2^i$ times o array, or in other words, a storage element with $2^i \times o$ entries, whereby i inputs are fed to a memory's address bus and o outputs are connected to a memory's data bus.

Figure 5A:
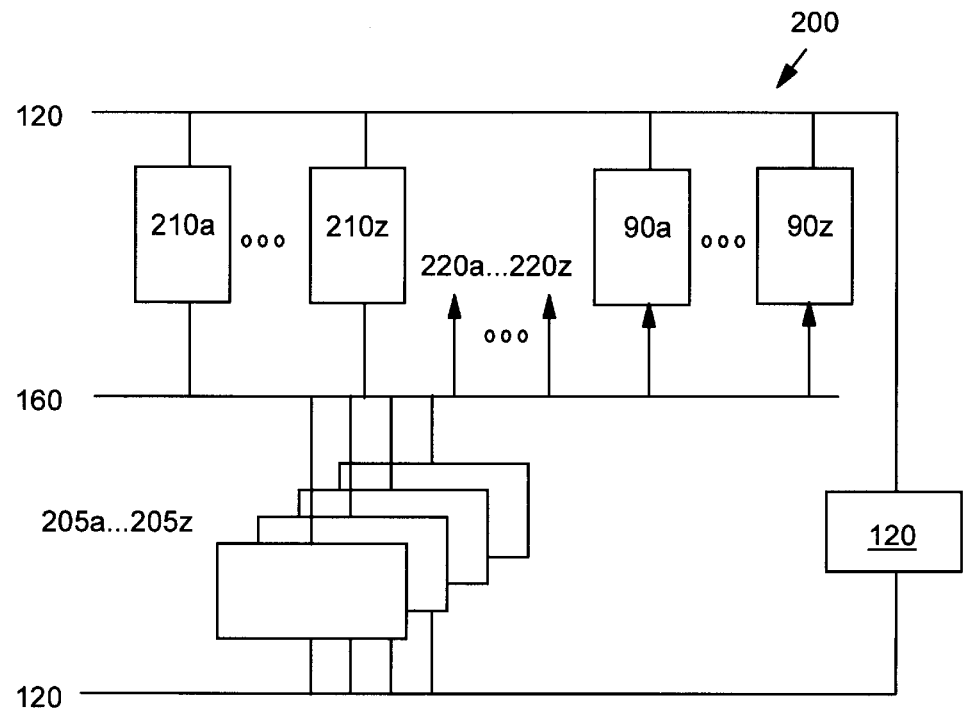
FIGS. 5a and 5b depict preferred embodiments of the invention.

FIG. 5a depicts a preferred embodiment wherein data-analyzing unit 200 comprises a plurality of event recognition units 205a . . . 2005z coupled to a general information bus 120 which might comprise information busses 120a . . . 120z. Each event recognition unit 205a . . . 2005z is coupled to a general output bus 160 comprising output busses 160a . . . 160z. One or more counters 210a . . . 210z and one or more memories 90a . . . 90z are also coupled to output bus 160, which also provides one or more outputs 220a . . . 220z of event recognition units 205a . . . 2005z. Counters 210a . . . 210z and memories 90a . . . 90z are coupled to information bus 120, so that counters 210a . . . 210z can feed back information to event recognition units 205a . . . 2005z and memories 90a . . . 90z can access data on information bus 120.

Figure 5B:
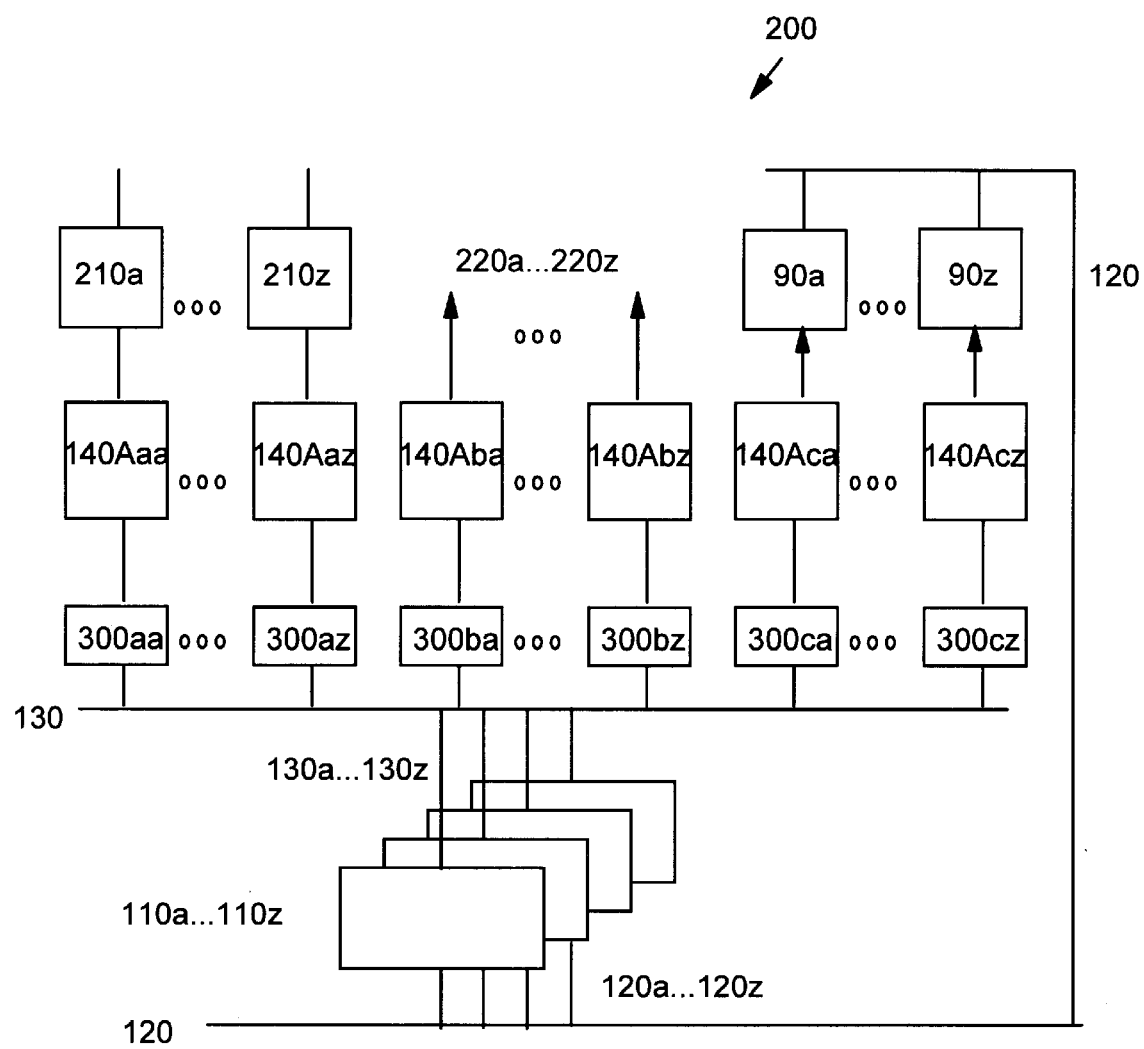

FIG. 5b depicts another preferred embodiment. A plurality of comparators 110a . . . 110z are coupled, via a plurality of information busses 120a . . . 120z, to information bus 120. A plurality of sequencer state machines 140A*aa* . . . 140A*cz* are respectively coupled, via optional multiplexors 300aa . . . 300cz, to a bus 130 (lines 130a . . . 130z) which as outputs from the plurality of comparators 110a . . . 110z.

Sequencer state machines 140A*aa* . . . 140A*az* are used for analyzing data on information bus 120 and outputs therefrom are coupled to counters 210a . . . 210z. Sequencer state machines 140A*ba* . . . 140A*bz* are used for monitoring customized rules and outputs thereof signal when respective rules are met. Outputs of sequencer state machines 140A*ca* . . . 140A*cz* are coupled to memories 90a . . . 90z, thus providing trace memories, whereby memories 90a . . . 90z are further coupled to the information bus 120. An optional alignment unit 310 might be coupled between memories 90a . . . 90z and information bus 120 to align the outputs from sequencer state machines 140A*ca* . . . 140A*cz* with the information to be stored. The alignment block preferably consists of a series of cascaded registers which to delay signals on input bus 120 by as many clock cycles as data needs to travel from: input bus 120 through comparators 110a . . . 110z, multiplexors 300ca . . . 300cz, and sequencer state machines 140A*ca* . . . 140A*cz* to propagate to memories 90a . . . 90z.

What is claimed is:

1. A data-analyzing unit for monitoring and/or analyzing events on an information bus, the data-analyzing unit including an event recognition unit comprising:

at least one comparator coupled to the information bus, each said comparator configured to produce an output in response to a determined event on said information bus;

a sequencer state machine coupled to said at least one comparator; and including a memory and a register, said register having one or more outputs coupled back to one or more inputs to said memory for enabling recording in said memory of a history of state outputs from said sequencer state machine, said sequencer state machine responsive to said history of state outputs and outputs from said at least one comparator for determining sequential dependencies of events, whereby a state output of the sequencer state machine is dependent on a historical sequence of information provided thereto.

2. The data-analyzing unit of claim 1, further comprising one or more counters coupled to the event recognition unit, each counter triggered by a state output change from said sequencer state machine to reflect a count of state changes.

3. The data-analyzing unit of claim 1, further comprising one or more memories coupled to the event recognition unit for providing trace data.

4. The data-analyzing unit of claim 1, wherein the event recognition unit provides customized rules for monitoring defined event sequences of event behaviors.

5. The data-analyzing unit of claim 1, comprising: a plurality of event recognition units coupled to one or more information busses, each event recognition unit being coupled to one or more output busses, whereby the plurality of event recognition units provide a plurality of outputs.

6. The data-analyzing unit of claim 5, further comprising one or more counters coupled to one or more output busses each of said counters triggered by a state output change from an event recognition unit to reflect a count of state changes.

7. The data-analyzing unit of claim 6, wherein the counters are coupled to the one or more information busses for feeding back information to the event recognition units and/or accessing data provided by the one or more information busses.

8. The data-analyzing unit of claim 5, further comprising one or more memories coupled to one or more output busses.

9. The data-analyzing unit of claim 8, wherein the memories provide historical information to the event recognition units.

10. The data-analyzing unit of claim 1, comprising:

a plurality of comparators coupled to one or more information busses, and a plurality of sequencer state machines respectively coupled to outputs from the plurality of comparators, whereby the sequencer state machines provide means for analyzing data on the one or more information busses and outputs of the sequencer state machines are coupled to one or more counters.

11. The data-analyzing unit of claim 1, comprising:

a plurality of comparators coupled to one or more information busses, and a plurality of sequencer state machines respectively coupled to outputs from the plurality of comparators, whereby the sequencer state machines provide means for monitoring customized rules and outputs of the sequencer state machines are adapted to provide signals when respective rules are met.

12. The data-analyzing unit of claim 1, comprising:

a plurality of comparators coupled to one or more information busses, and a plurality of sequencer state machines respectively coupled to outputs from the plurality of comparators, whereby the sequencer state machines provide means for tracing information on the one or more information busses and outputs of the sequencer state machines are coupled to one or more memories, whereby the memories are further coupled to the one or more information busses.

13. The data-analyzing unit of claim 12, further comprising an alignment unit for aligning the outputs from the sequencer state machines with the information to be stored in the one or more memories.

* * * * *